US006211888B1

(12) United States Patent
Ohtsuki et al.

(10) Patent No.: US 6,211,888 B1
(45) Date of Patent: Apr. 3, 2001

(54) PLANAR FLOW DISPLAY METHOD

(75) Inventors: Shigeo Ohtsuki, 12-15, Yokoyama 2-chome, Sagamihara-shi, Kanagawa; Motonao Tanaka, Sendai, both of (JP)

(73) Assignees: Kotaro Fukuda, Tokyo; Shigeo Ohtsuki, Kanagawa; Motomao Tanaka, Miyagi, all of (JP)

( * ) Notice: Subject to any disclaimer, the term of this patent is extended or adjusted under 35 U.S.C. 154(b) by 0 days.

(21) Appl. No.: 09/159,688

(22) Filed: Sep. 24, 1998

(30) Foreign Application Priority Data

Sep. 30, 1997 (JP) .................................................. 9-266445

(51) Int. Cl.[7] .................................................. G06T 11/20
(52) U.S. Cl. ............... 345/440; 128/660.05; 128/661.09; 600/455; 345/425
(58) Field of Search ..................................... 345/419, 425, 345/440; 73/861.25; 703/9; 128/660.05, 661.09; 600/455

(56) References Cited

U.S. PATENT DOCUMENTS 5,010,528   4/1991  Ohtsuki et al. .
5,425,365 * 6/1995  Iinuma ............................... 73/861.25
5,947,903 * 7/1999  Ohtsuki et al. ....................... 600/455

FOREIGN PATENT DOCUMENTS 0890 825   1/1999  (EP) .

* cited by examiner

Primary Examiner—Mark Zimmerman
Assistant Examiner—Kimbinh T. Nguyen
(74) Attorney, Agent, or Firm—Dickstein Shapiro Morin & Oshinsky LLP

(57) ABSTRACT

A flow display method enabling the state of flows in a plane to be grasped together with inflow into and outflow from that plane. A Doppler method, for example, is used to obtain a velocity profile at each point in a planar area (100) of interest defined in a three-dimensional flow. A flow rate profile in the planar area (100) is found on the basis of the thus obtained velocity profile. From the flow rate profile and the velocity profile there are determined source points (12) representative of inflow into the planar area (100) and sink points (14) representative of outflow therefrom. Contour lines in the flow rate profile then join the source points (12) and the sink points (14) to obtain a display of planar streamlines (10).

9 Claims, 9 Drawing Sheets

PATHS TO FIND FLOW FUNCTION
BY SECTOR SCANNING

PLANAR FLOW DISPLAY METHOD

BACKGROUND OF THE INVENTION

1. Field of the Invention

The present invention relates generally to a flow display method, and more particularly to a method of displaying the state of flows in a planar area defined in a three-dimensional flow.

2. Description of the Related Art

An ultrasonic pulse Doppler method has been put to practical use which utilizes the Doppler effect of ultrasonic waves to observe a flow velocity profile of a fluid in a plane to be observed. The ultrasonic pulse Doppler method is used for observation of intracardiac blood flow velocity, for instance. In the ultrasonic pulse Doppler method, an ultrasonic probe sends and receives a pulse-like ultrasonic beam for scanning a plane to be observed to thereby acquire flow velocity information at each point in the plane. As is well known, the thus acquired velocity information at each point is displayed in such a manner that a flow approaching the ultrasonic probe and a flow moving away therefrom are colored differently, with the magnitude of the velocity being indicated by the luminance. For example, the blood flow velocity profile obtained by the pulse Doppler method is displayed in color superposed on a cardiac ultrasonic tomographic image so as to be utilized for the intracardiac blood flow diagnosis.

A Doppler radar making use of Doppler effect of radio waves is known as an apparatus utilizing the Doppler method, and is used for weather observation such as observation of the flow of clouds.

Such a velocity observation method utilizing Doppler effect has in principle a restriction that it is possible to obtain the velocity information only in the direction of send and receipt of the observation beam (ultrasonic wave or radio wave). Therefore, conventional ultrasonic diagnostic apparatuses or the like have typically provided a display of only the velocity components in the direction of send and receipt of the observation beam at each point.

The velocity observation method utilizing Doppler effect has acquired and displayed information on the flow velocity profile in a two-dimensional scanning plane (i.e., observation plane) which is scanned by the observation beam such as an ultrasonic wave or radio wave.

However, the actual flow is a three-dimensional flow, and the flow velocity profile obtained by the ultrasonic diagnostic apparatuses or the like merely represents components in the scanning plane of the three-dimensional flow. In addition, the components represented thereat are eventually only the velocity components in the beam direction. Although the actual flow has a three-dimensional inflow into and outflow from a planar area to be observed, no consideration has hitherto been given to such inflow and outflow with no display thereof.

Some ultrasonic diagnostic apparatuses have combined Doppler velocity measurement values obtained by the ultrasonic beams in two directions to acquire a two-dimensional flow velocity. The conventional apparatuses of this type have typically provided a display of the velocity profile such that a flow velocity at a lattice point defined in the plane to be observed is displayed in the form of a vector with arrow. That is, such apparatuses have also merely allowed a display of the two-dimensional flow velocity components in the plane to be observed, with no display of the state of inflow/outflow of the three-dimensional flow into/from the plane to be observed.

Although the above description has been made of the apparatuses observing the flow by use of the Doppler method by way of example, other general systems for the display of the flow such as fluid simulation systems have also not provided a display of the flow in the two-dimensional planar area defined in a three-dimensional flow in the form of inclusion of the state of the three-dimensional inflow and outflow.

SUMMARY OF THE INVENTION

The present invention was conceived in order to solve such problems. It is therefore the object of the present invention to provide a method of displaying planar flows, allowing the state of the flows in a plane to be grasped together with inflow into and outflow from the plane.

To achieve the above object, one aspect of the invention provides a method of displaying planar flows in a planar area defined in a three-dimensional flow, the method comprising the steps of, determining source points and sink points in the planar area on the basis of velocity information at each point in the planar area; finding a flow function as planar area on the basis of velocity information at each point in the planar area; and displaying contour lines of the flow function in the form of planar streamlines, between the source points and sink points which have the same values of the flow function.

DESCRIPTION OF THE PREFERRED EMBODIMENTS

An embodiment of the present invention will now be described with reference to the accompanying drawings.

A streamline is one means of representing a flow field. The streamline is useful as means of visually recognizing a state of flow at a given instant. It is to be noted that a streamline representative of a three-dimensional flow results naturally in a three-dimensional curve and hence is not suitable for representing a flow in a two-dimensional plane without any additional measures. Thus, this embodiment employs the concept of a planar streamline to represent the state of flow in the plane. The planar streamline is defined as follows.

Figure 1:
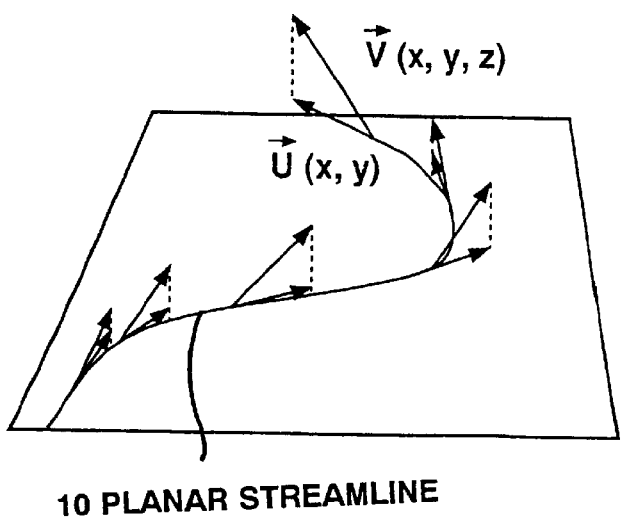
FIG. 1 is an explanatory diagram of a planar streamline.

As shown in FIG. 1, consideration is made of a three-dimensional flow velocity vector $\vec{V}$ (x, y, z) of each point in a plane of interest. Then, when a curve is plotted in the plane, if the direction of a tangent at each point on the curve coincides with planar components $\vec{U}$ (x, y) of the flow velocity vector at the each point, that curve is called a planar streamline (designated at planar streamline 10 in FIG. 1).

This embodiment figures out and displays a planar streamline in a plane of interest within a three-dimensional flow to thereby show the state of flow in that plane.

Furthermore, this embodiment figures out and displays a source point and a sink point in the plane upon display of the planar streamline. By displaying the source point and the sink point in this manner, this embodiment allows recognition of, in addition to the state of flow within the interior of the plane, the status of inflow/outflow of a three-dimensional flow into/from that plane.

Figure 2:
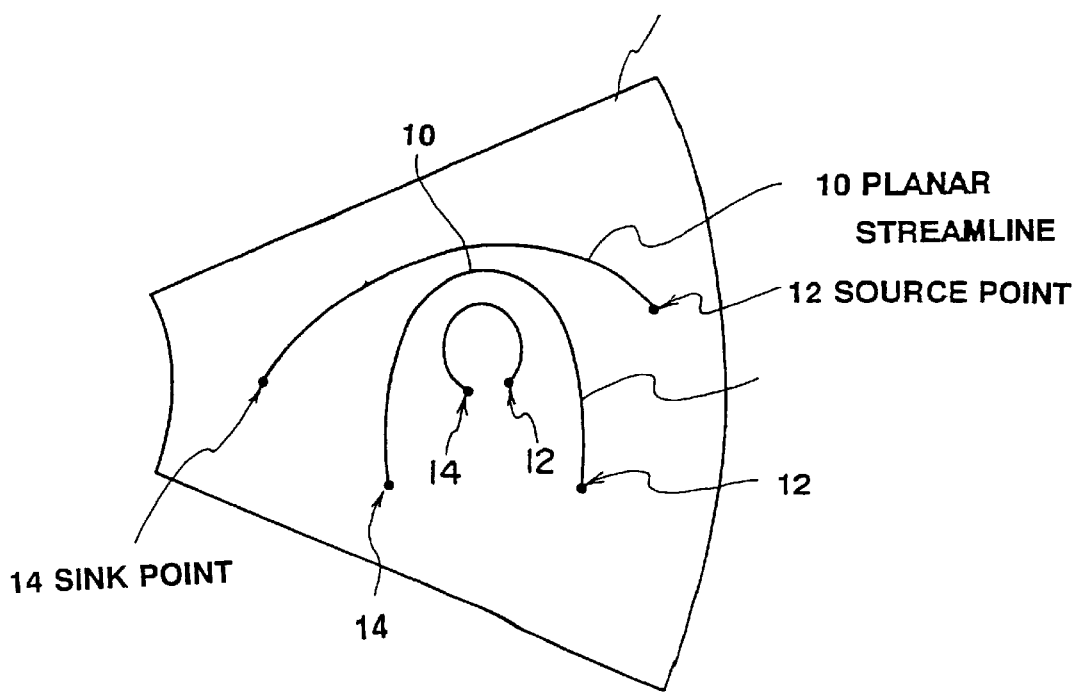
FIG. 2 is a diagram showing an example of a display (planar streamline display) of planar flows generated by a method of an embodiment.

FIG. 2 illustrates by way of example a display of a planar flow created by a method of this embodiment. As can be seen in FIG. 2, this embodiment displays the state of planar flow by use of a planar streamline 10 starting from a source point 12 and terminating at a sink point 14.

A method of creating such a display will be described in detail hereinbelow.

[Flow Function]

Description will first be made of a flow function for use in obtaining the planar streamline, etc. The flow function is an extension of a stream function in the two-dimensional flow from the viewpoint of the flow rate.

It is well known that the stream function applied to the two-dimensional flow represents a flow rate with respect to a reference point. A contour line of this stream function is in the form of a streamline. The direction of the flow velocity vector can be seen from the direction of tangent of the streamline, and the magnitude of the flow velocity vector can be seen from the interval of the adjacent streamlines. Such a display of the planar flow in the form of the streamline enables the entire flow to be recognized in a quantitative manner.

In the case of a plane defined in the three-dimensional flow, the flow includes components which pass through the plane three-dimensionally. This embodiment treats such three-dimensional flow components with respect to the plane as the source or sink, thereby enabling the planar flow to be dealt with two-dimensionally. The flow function for use in this embodiment is obtained by extending the stream function in the two-dimensional flow through the incorporation of the three-dimensional flow components in the form of the source or the sink.

Figure 3:
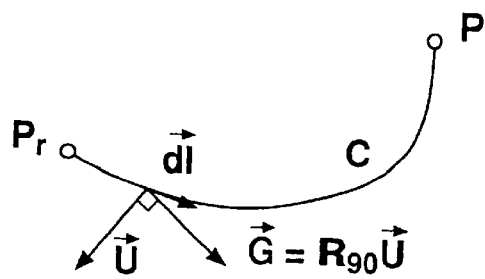
FIG. 3 is an explanatory diagram of the definition of the flow rate between two points.

In a manner shown in FIG. 3, a flow rate Q is obtained by a line integral along a curve C in a plane x-y. In order to ensure that the flow rate can be represented as a vector inner product, let $R_{90}$ be an operator for rotating the vector through 90° within the plane, and let a flow rate gradient vector be a vector $\vec{G}$ (x, y) obtained by rotating through 90° the x-y planar components $\vec{U}$ (x, y) of the three dimensional flow velocity vector $\vec{V}$ (x, y, z). This flow gradient vector $\vec{G}$ (x, y) can be given as

[Equation 1]

$$\vec{G}(x, y) = R_{90}\vec{U}(x, y) \qquad (1)$$

As a result, the flow rate Q passing through the curve C between a point $P_r$ and a point P of FIG. 3 is given as follows from the line integral, with the operator "·" representative of a vector inner product.

[Equation 2]

$$Q = \int_c \vec{G} \cdot \vec{dl}$$

Here, the flow function Q(x, y) associated with the reference point $P_r$ of FIG. 3 is defined as a flow rate across an arbitrary path C joining the reference point $P_r$ and an arbitrary point P(x, y). That is,

[Equation 3]

$$Q(x, y) = \int_c \vec{G} \cdot \vec{dl} \qquad (2)$$

is given.

[Extension to Three-Dimensional Flow]

The planar flow function Q (x, y) has thus been defined although the flow to be dealt with herein is a three-dimensional flow. For consideration, the planar flow is divided into a pure planar flow component and components flowing into and out of the plane. This embodiment quantizes inflow/outflow occurring generally in dispersed manner into inflow/outflow at points at every unit flow rate q. The inflow and outflow points defined by the quantization are treated respectively as the source and sink so that the influence of the three-dimensional flow component can be incorporated into two-dimensional flow plotting means in the form of the flow function. Since, as will be described later, the display method of this embodiment allows a display of a planar streamline joining the source point and the sink point, the source point and the sink point are hereinafter referred to generically as simple sources.

Figure 4:
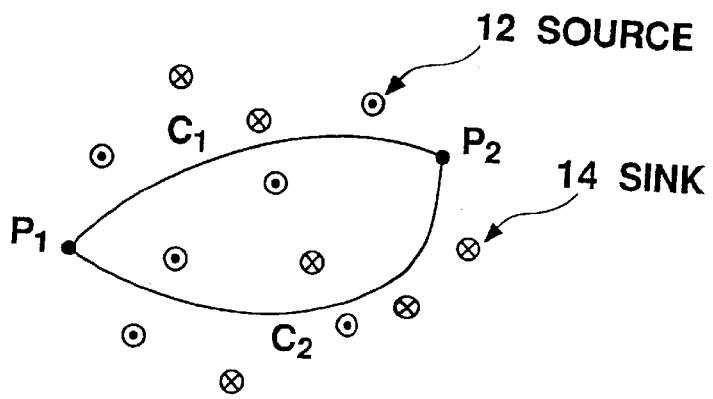
FIG. 4 is an explanatory diagram showing source points and sink points as well as a relationship of the flow rate between two points.

For two paths $C_1$ and $C_2$ from a point $P_1$ to a point $P_2$ as shown in FIG. 4, consideration is made of a relationship between the flow rate $Q_1$ at the path of the curve $C_1$ and the flow rate $Q_2$ at the path of the curve $C_2$. Within an area enclosed by these two curves, let $n_p$ and $n_k$ be the source point and the sink point, respectively. Then,

[Equation 4]

$$Q_1 = Q_2 + n_p q - n_k q = q_2 + nq$$

The value of this n depends on the path.

In this manner, the flow function Q (x, y) at a certain point P (x, y) in a certain planar area in the flow can be defined as a multi-valued function which has a discrete value at every unit flow rate q with a certain value as the reference. In this case, the fluid which defines the flow rate expressed by this flow function Q (x, y) is supplied from simple sources in the planar area and from a boundary line of that planar area. The former represents three-dimensional outflow/inflow components and the latter represents two-dimensional flow components. Therefore, the flow function Q (x, y) is divided into a simple source flow function $Q_p$ (x, y) which is a multi-valued function expressing the flow associated with the simple sources and a linear boundary flow function $Q_b$ (x, y) which is a single-valued function dealing with only the outflow from/inflow into the boundary line. That is,
[Equation 5]

$$Q(x, y) = Q_b(x, y) + Q_p(x, y)$$

In this case, the linear boundary flow function is a two-dimensional flow stream function.

Use of the flow function enables the fact that the contour line of the two-dimensional flow stream function results in a streamline to be utilized in the plane having three-dimensional inflow/outflow as well.

By treating the dispersed inflow/outflow as point sources (simple sources) through the concentration at every unit flow rate in this manner, the general planar flow having the inflow/outflow can be expressed by a discrete flow function. Since this discrete flow function varies at unit flow rate intervals on a layer-to-layer basis, the contour lines at every unit flow rate coincide with one another in all the layers so that these contour lines can collectively be displayed in the form of streamlines on the plane to be observed. In other words, the streamlines at unit flow rate intervals can be expressed by the contour lines coincident between the layers of the discrete flow function. Hereinafter, the discrete flow function is also referred to simply as a flow function.

Figure 5:
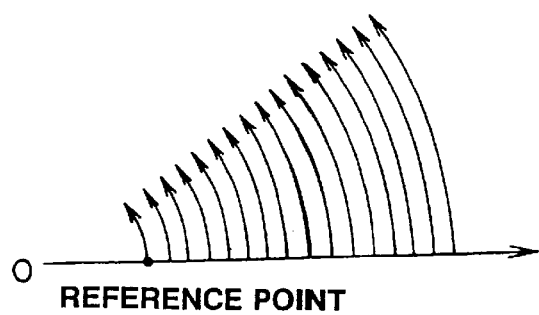
FIG. 5 is a diagram showing an example of paths to find a flow function by a sector scanning.

The flow function capable of expressing the simple sources (source point and sink point) is typically multi-valued. This is inconvenient for dealing with actual numerical data. In this case as well, however, a single-valued function is obtained by defining a reference point and unitarily specifying a path from this reference point to a point for which a function value is to be found. This embodiment determines a function value at each point by specifying a method which unitarily defines a single path from the reference point and allows scanning of the entire area to be observed. Discontinuous parts of the thus obtained single-valued function indicate different layers, so that continuous flow function values in the same layer are obtained by adjusting by the unit flow rate. FIG. 5 illustrates an example of paths to find a flow function by sector scanning in the polar coordinates.

[Determination of Simple sources]

Description will next be given of a procedure for determining a source point and a sink point serving as the simple sources. A specific example is given below of an intracardiac blood flow display in a sector scanning ultrasonic Doppler diagnostic apparatus. To this end, polar coordinates having an origin which is the position of an ultrasonic probe are used as coordinate systems.

Figure 6:
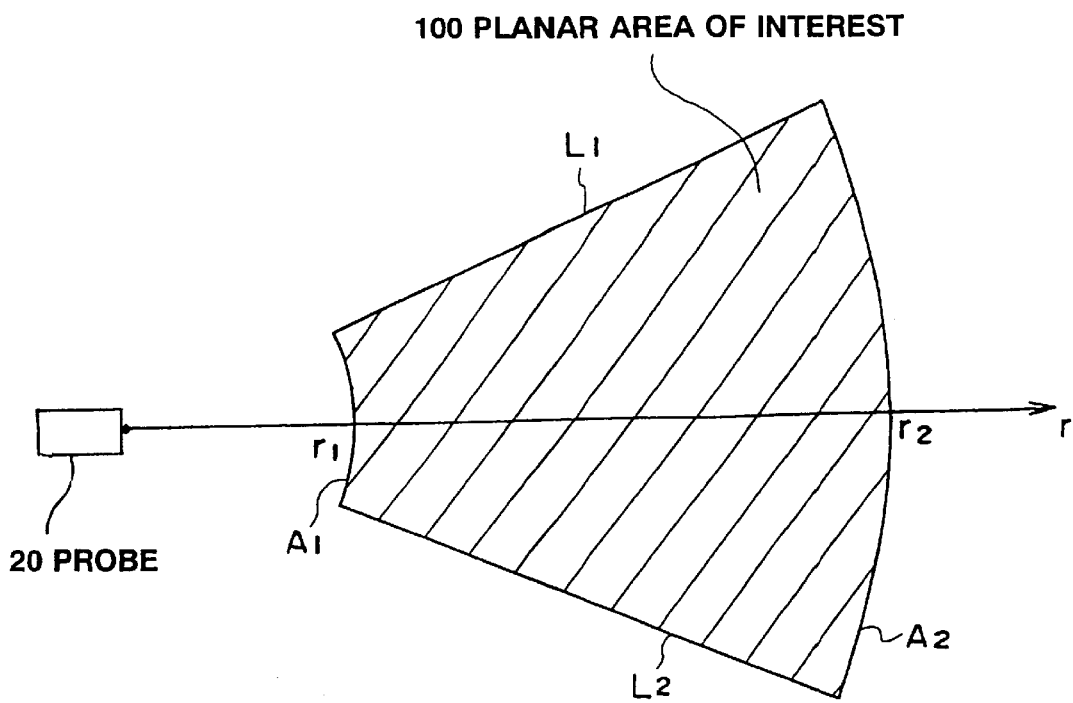
FIG. 6 is a diagram showing an example of a planar area of interest to be displayed.
Figure 7:
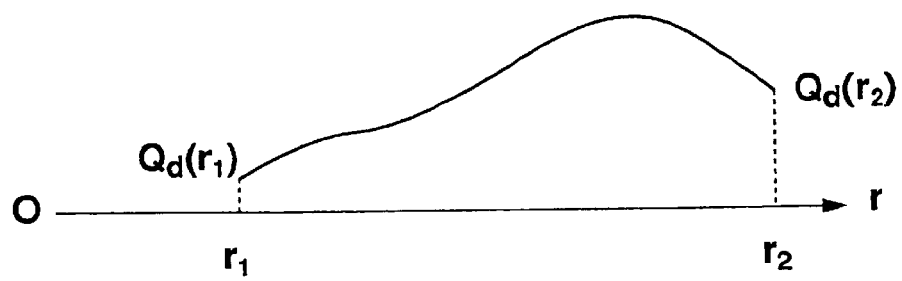
FIG. 7 is a diagram showing an example of a flow range function.

A target planar area (hereinafter referred to as a planar area of interest) is first defined as a sector area 100 enclosed by straight line boundaries and circular segment boundaries as shown in FIG. 6. The origin O in FIG. 6 is the position of an ultrasonic probe 20. A flow range function $Q_d(r)$ as shown in FIG. 7 is derived from a Doppler velocity profile in the planar area 100 of interest obtained by the Doppler method. That is, the flow range function $Q_d(r)$ represents a total flow which passes through a circular segment of which distance from the origin O is r in the planar area of interest. This flow range function $Q_d(r)$ can be obtained by integrating, from one end of the circular segment to the other end thereof, the beam direction velocity of flow at each point on the circular segment with the distance r derived from the Doppler method. For instance, a flow range function $Q_d(r_1)$ represents a flow rate flowing out of a circular segment boundary $A_1$, while a flow rate distance function $Q_d(r_2)$ represents a flow rate flowing out of a circular segment boundary $A_2$. A change in the flow rate function $Q_d(r)$ between the distance $r_1$ and $r_2$ represents a quantity flowing into/from the planar area 100 of interest from/into the lateral boundaries $L_1$ and $L_2$ and the exterior.

Figure 8:
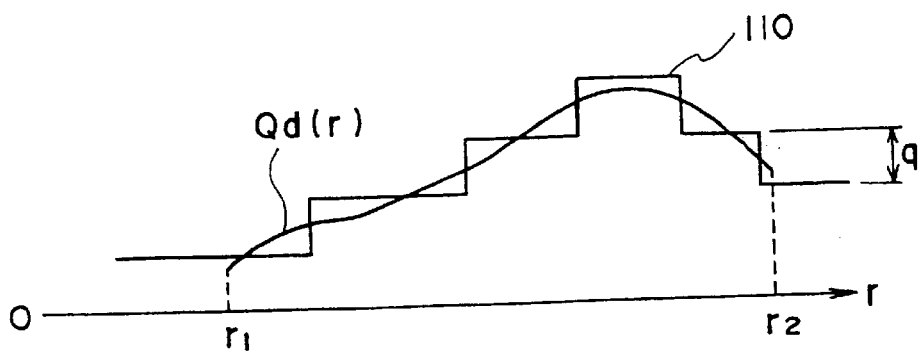
FIG. 8 is an explanatory diagram of the quantization of the flow range function.

This flow range function $Q_d(r)$ is used to quantize the inflow/outflow from/into the exterior of the plane into/from the planar area of interest. This quantization is carried out by approximating the flow range function $Q_d(r)$ by a stepwise function which varies at every predetermined unit flow rate q. FIG. 8 illustrates by way of example a stepwise function 110 obtained through this approximation. This embodiment regards each step of this stepwise function as a position (a distance from the origin) of the simple source. The downward steps indicate a source point while the upward steps indicate a sink point.

The above is an example in the case of sector scanning. In the case of linear scanning, a rectangular coordinate system with x-axis coincident with the beam direction is envisaged, for example, so that a total flow $Q_d(x)$ passing through a path (y=constant) orthogonal to the beam direction is found for each value of x. This $Q_d(x)$ results in a flow range function.

Figure 9:
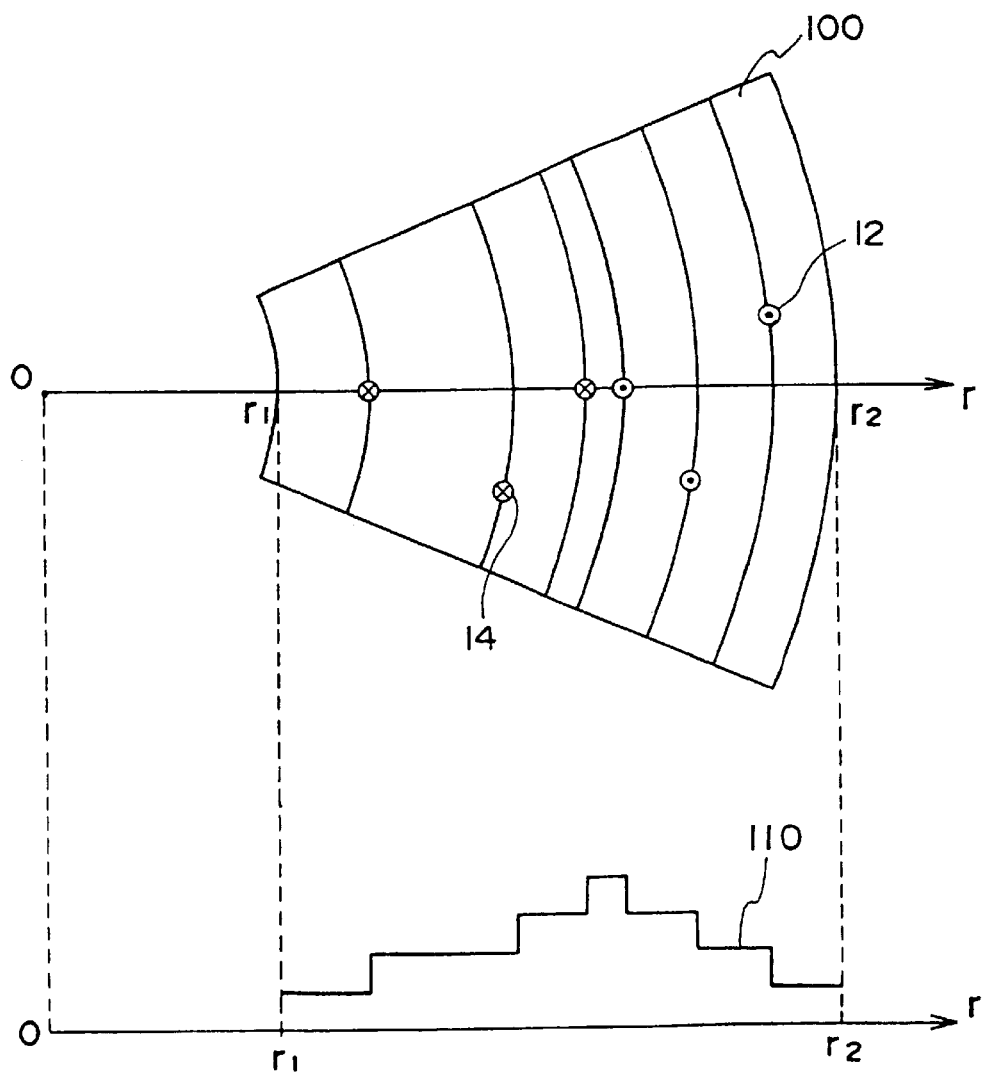
FIG. 9 is an explanatory diagram showing the quantized flow range function and positions of the source points and sink points determined on the basis of that function.

After finding of the distance of the simple sources (source point and sink point) from the origin O in this manner, it is determined at which position the source point and the sink point lie on the circular segment of the distance. The rate of change of the Doppler velocity is expected to be extremum in the vicinity of the positions of the simple sources. Thus, this embodiment sets the position of the source point to a position where the rate of change in the beam direction of the Doppler velocity is negative with a maximum absolute value on the corresponding circular segment, whereas it sets the position of the sink point to a position where the rate of change in the beam direction of the Doppler velocity is positive with a maximum value on the corresponding circuit segment. In this manner, as shown in FIG. 9 for example, determination is made of positions of the simple sources (the source point 12 and the sink point 14) representative of the outflow/inflow components from/into the planar area of interest.

Description has been given hereinabove of the method of determining the simple sources (the source point, and the sink points) on the basis of the results of observation of the ultrasonic Doppler diagnostic apparatus. However, this method is applicable similarly to data other than the results of observation based on the Doppler method (e.g., a flow field obtained by a numerical simulation). In a case where a velocity field of a fluid in the three-dimensional space has been obtained from the numerical simulation for instance, a flow range function in a planar area of interest defined in that space is found on the basis of velocity information at each point in the planar area so that the simple sources can be found thereafter by performing the quantization, etc., in the same manner as the above based on the resultant flow range function. In any event, if a profile of the two-dimensional velocity components in the planar area is obtained by means of any method, then it is possible to obtain the source point and the sink point in that planar area on the basis of the profile.

Although in the above example there has been described the case where the sectorial planar area of interest is dealt with by the polar coordinates form, it will be easily understood that the method of this embodiment could be applied to a case where a rectangular planar area of interest is dealt with by the rectangular coordinates form.

Since each simple source determined in this manner is either the source or sink of the unit flow rate q, it is possible to determine a flow function for each simple source. Superposition of all of such flow functions for respective simple sources results in a quantization of inflow/outflow components into/from the planar area of interest from/into the exterior of the area.

[Planar Streamline Display Using Flow Function]

Determination of the simple sources (the source point and the sink point) in this manner allows display of a planar streamline having these simple sources as a start point and a terminating point.

To this end, a flow function Q (r, θ) (in the case of the polar coordinate display; Q (x, y) for the rectangular coordinate system) is found from the two-dimensional velocity profile in the planar area of interest using the above equations (1) and (2). By plotting contour lines of this flow function Q (r, θ), planar streamlines in the planar area 100 of interest are obtained. It is to be noted that innumerable contour lines of the flow function Q(r, θ) could be plotted, so that the plotting of all of them will make it impossible to identify them. Thus, this embodiment plots contour lines having respective start points and terminating points in the form of the above source points and sink points. This allows the planar streamlines at contour intervals (i.e. unit flow q) to be displayed.

More specifically, displayed as the planar streamlines are joints of points having a flow rate value (i.e., a value of the flow function Q(r, θ)) equal to that of the source point and the sink point between the source point and the sink point in the same layer (i.e., having the same flow function value). Now, in case discontinuity in the data values is predicted in view of the source or sink based layer structure of the flow function, use is made of a corrected value obtained by adding/subtracting a certain value to/from the unit flow rate, thereby plotting streamlines in the form of contour lines under the circumstances where they are regarded as data in the same layer. As already described, a difference in the flow rate between the adjacent layers is equal to the unit flow rate, so that the contour lines at unit flow rate intervals in all the layers are displayed as the same planar streamline.

As described hereinabove, by approximating the outflow/inflow in the planar area of interest by the profile of the simple sources (the source points and the sink points) at every unit flow rate, it is possible to represent the planar flow in the form of a quantized flow function. By plotting the contour lines of this quantized flow function at unit flow rate intervals, a planar streamline display is obtained.

Through such a procedure there is acquired a display of the planar streamlines 10 in the planar area of interest as shown in FIG. 2. In this display, the source points 12 and the sink points 14 are positioned at opposed ends of each planar streamline 10. In the case of application to the ultrasonic diagnostic apparatus for instance, this planar streamline display could be made in color in a manner superposed on the conventional Doppler blood flow display for instance. At that time, if the source points 12 and the sink points 14 are displayed in different display colors from the planar streamline 10, then it will become easy to distinguish the source point 12 from the sink point 14. Naturally, it is not essential to definitely display the source point 12 and the sink point 14 since the terminal ends of the planar streamline 10 are the source point 12 and the sink point 14.

In such a planar streamline display, each source point 12 has a level different by the unit flow rate q, and the same applies to each sink point 14, with the result that the planar streamline 10 plotted for each pair of the source point 12 and the sink point 14 having the same level results in a streamline at every contour interval q. Accordingly, such a planar streamline display provides a quantitative nature in that the flow is faster at positions where the planar streamlines 10 are close but is slower at positions where they are sparse. Also, the direction of the tangent at each point on the planar streamline indicates the direction of the flow at that point. Furthermore, according to the planar streamline display of this embodiment, there are displayed the source point 12 and the sink point 14 in the planar area 100 of interest, with the result that it is possible to grasp the tendency of the three-dimensional outflow from/inflow into the planar area 100 of interest.

It is to be appreciated that in this embodiment, the number (density) of the planar streamlines could be controlled by varying the unit flow rate q upon the quantization.

Figure 16:
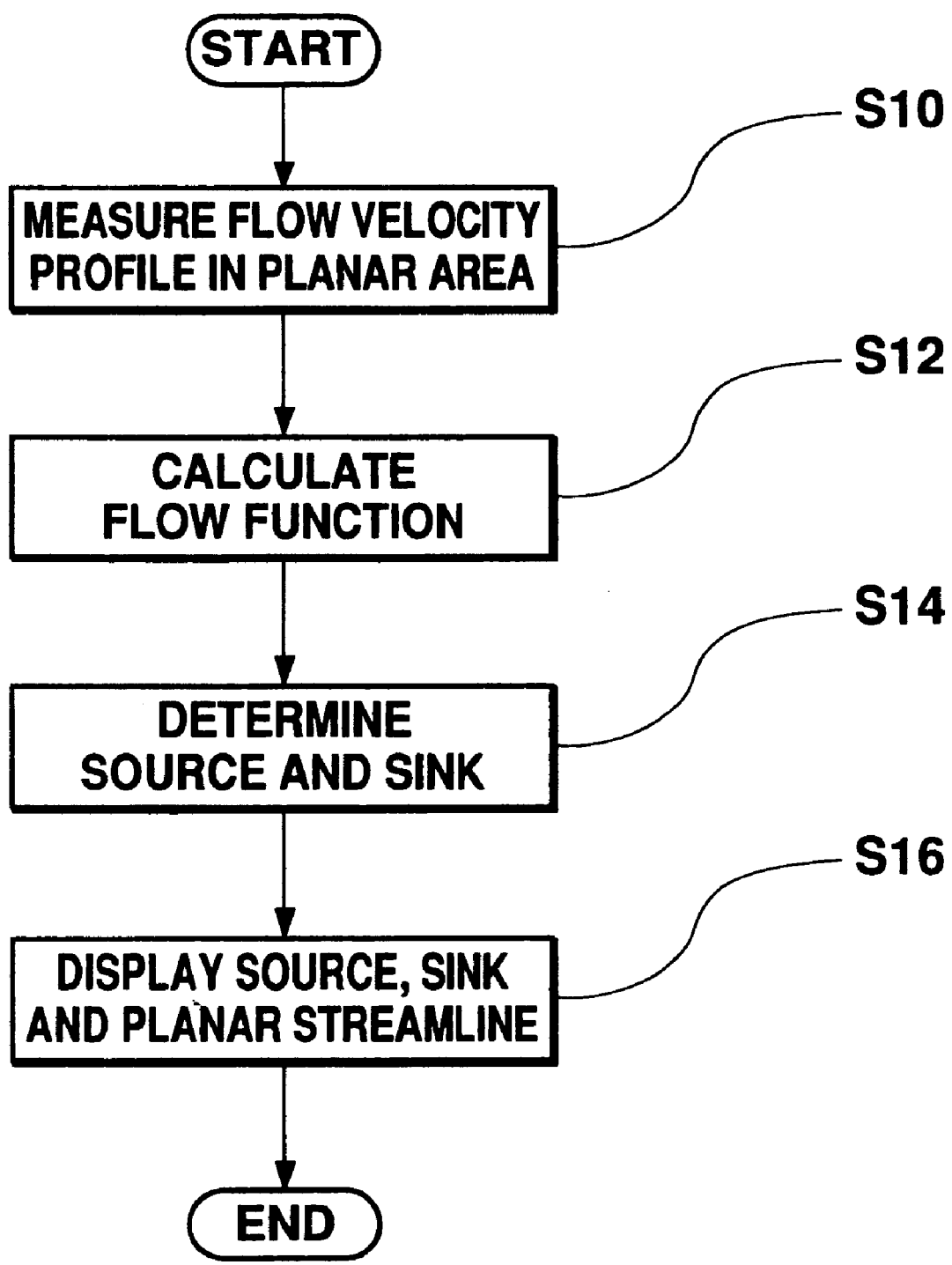
FIG. 16 is a flowchart showing a procedure of the embodiment.

In this embodiment, as set forth hereinabove, a flow velocity profile is found in the planar area of interest by means of the Doppler method, etc., as shown in FIG. 16 (S10). Then, on the basis of the flow velocity profile there are estimated positions of the source point and the sink point representative of the three-dimensional outflow from/inflow into the planar area of interest (S12). This estimation is carried out by finding a flow range function from the flow velocity profile and approximating it by a stepwise function which varies at every predetermined unit flow rate. Also, the flow function in that planar area is found on the basis of the flow velocity profile (S14). The order of execution of S12 and S14 may be inverted. Then, the estimated source point and sink point and the contour lines (planar streamlines) of the flow function found in S12 are displayed (S16). This display provides contour lines each having a certain flow rate value and extending from the source point to the sink point which have the same flow rate value as the certain flow rate value. This allows separate display of the planar streamlines at every unit flow rate, as well as display, in the form of the source point and the sink point, of the tendency of the three-dimensional inflow into/outflow from the planar area of interest.

[Planar Streamline Display]

Preferred examples of the mode of display of the planar streamlines will now be described.

Figure 10:
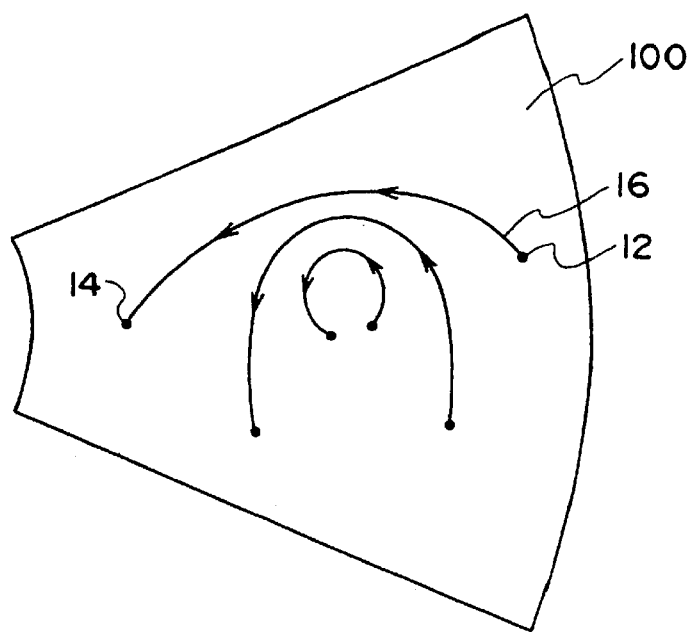
FIG. 10 is a diagram showing an example of the display of planar streamlines with arrows.

It will be convenient in the display of the planar streamlines if the direction of the flow can be grasped. Conceivable as the method of display indicating the direction of the flow is a method using planar streamlines 16 with arrows as shown in FIG. 10.

Figure 11:
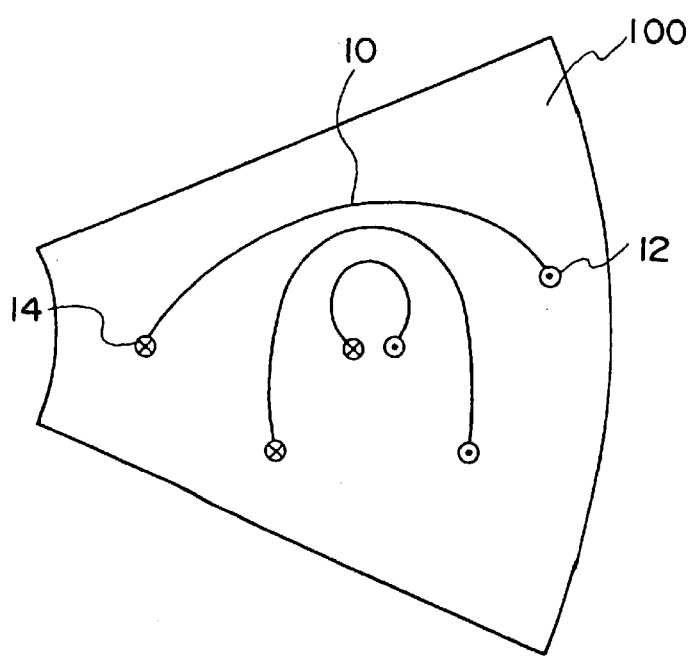
FIG. 11 is a diagram showing an example of the display of the planar streamlines, allowing the source points and the sink points to be distinguishably displayed.

It is also preferred to indicate the source point 12 and the sink point 14 with different marks or in different display colors, for instance as shown in FIG. 11, to thereby provide displays that are distinguishable from one another. According to this display mode, it is possible for the user to easily recognize the source point 12 and the sink point 14 as well as the direction of the flow, which in this case is directed from the source point 12 toward the sink point 14.

Figure 12:
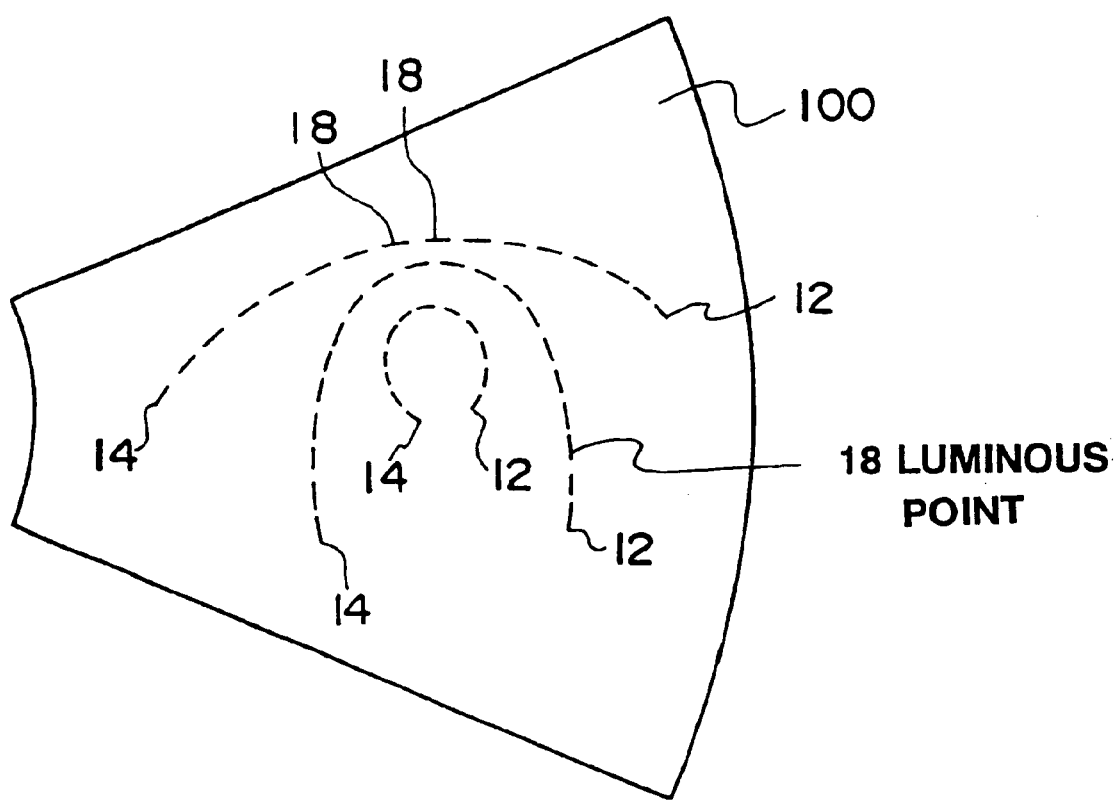
FIG. 12 is a diagram for explaining an example of the display indicating the direction of the flow by luminous points moving along the planar streamlines.

Also, as shown in FIG. 12, by providing a dynamic image display in such a manner that a single or a plurality of luminous points 18 move along the planar streamline from the source point 12 toward the sink point 14, it is possible to more realistically grasp the state of the flow in the planar area of interest.

[Other Examples of Application]

The planar flow display method in accordance with the present invention has been described hereinabove, taking the ultrasonic Doppler diagnostic apparatus as its major example. As is apparent from the above description, the invention is not limited to the ultrasonic Doppler diagnostic apparatus, but instead is applicable to, e.g., the numerical simulation or other display of the state of the planar area of interest in the three-dimensional flow field obtained by other various apparatuses and methods. That is, the method of this embodiment is applicable as long as the velocity profile of the flow in the planar area of interest is obtained and the flow rate profile (expressed by the flow function, etc.) at that plane can be found on the basis of that velocity profile.

Thus, description will now be given of a planar flow display of a flow which has theoretically been obtained. Here, taking as an example a laminar flow in a cylinder (see FIG. 13) well known as a Hagen-Poiseuille flow, a display of the planar flow in a planar area of interest defined in this flow will be described.

Figure 13:
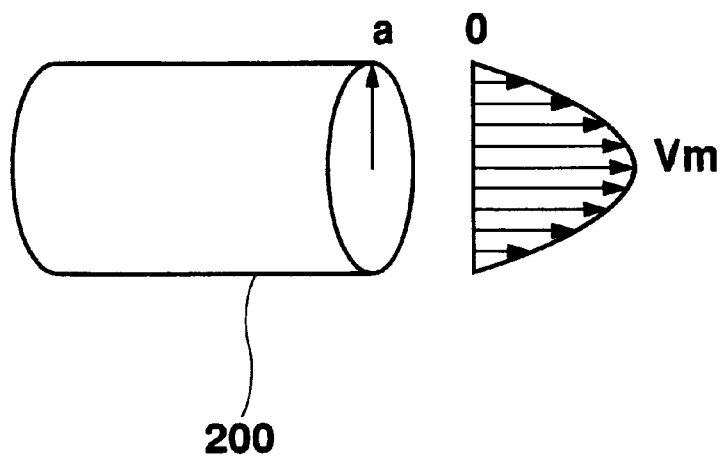
FIG. 13 is a diagram for explaining a laminar flow in a cylinder and its flow velocity profile.
Figure 14:
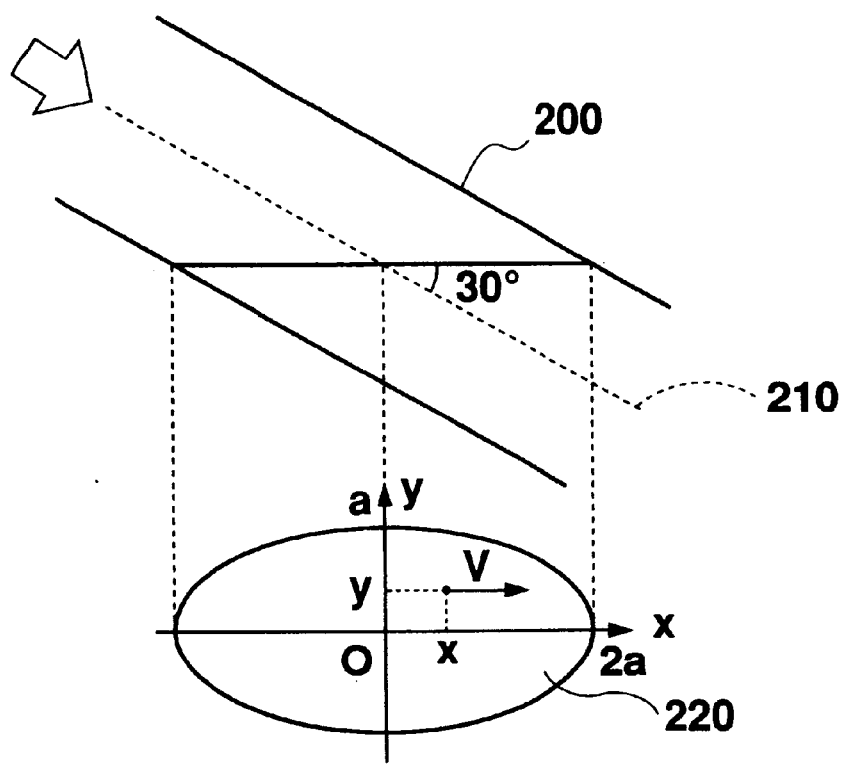
FIG. 14 is a diagram for explaining a planar area of interest defined relative to the laminar flow in the cylinder.

In the example of FIG. 13, a cylinder 220 has an inner diameter of 2$a$, and the radial velocity profile describes a parabola with the maximum velocity $V_m$. With respect to such a three-dimensional flow, there is defined a planar area 220 of interest which is a section obtained by diagonally cutting the cylinder 200 at an angle of 30° relative to its central axis as shown in FIG. 14. Consideration is given of a display of the state of flow in this planar area.

For the elliptical planar area 220 of interest, x-y coordinates are defined with its major axis representing the x-axis as shown in FIG. 14. The magnitude V(x, y) of flow velocity components in this planar area 220 can be expressed as follows.

[Equation 6]

$$V(x, y) = \frac{\sqrt{3}}{2} V_m \left(1 - \frac{x^2}{4a^2} - \frac{y^2}{a^2}\right)$$

Here, a unit flow rate $q_u$ is defined for instance as follows, with the intention of displaying the planar streamlines.

[Equation 7]

$$q_u = V_m a/(2 \cdot 3)^{1/2}$$

Here, when a flow rate is considered at a rectilinear path which passes through each point on the x-axis and extends in parallel to the y-axis in the planar area 220 of interest, a flow range function $Q_0(x)$ is given as follows.

[Equation 8]

$$Q_0(x) = \frac{2}{\sqrt{3}} V_m a \left(1 - \frac{x^2}{4a^2}\right)^{\frac{3}{2}}$$

This flow range function $Q_0(x)$ is quantized by the unit flow rate $q_u$. In this case, a first step of a stepwise function obtained as a result of the quantization has a range of x exceeding half ($q_u/2$) of the unit flow rate $q_u$. Since this range is $-3^{1/2}a < x < 3^{1/2}a$, the source point and the sink point are given as ($-3^{1/2}a$, 0) and ($3^{1/2}a$, 0) so that a planar streamline from that source point to sink point is displayed.

A case will be considered f a flow rate $Q_{12}(x)$ at a rectilinear path obtained when the value of y has changed from $y_1$ to $y_2$ with respect to a certain x, that is, a rectilinear path joining (x, $y_1$) and (x, $y_2$). This flow rate $Q_{12}(x)$ is given as [Equation 9]

$$Q_{12}(x) = \frac{\sqrt{3}}{2a^2} V_m (y_2 - y_1) \left(a^2 - \frac{x^2}{4} - \frac{(y_2 - y_1)^2}{3} - y_1 y_2\right)$$

Figure 15:
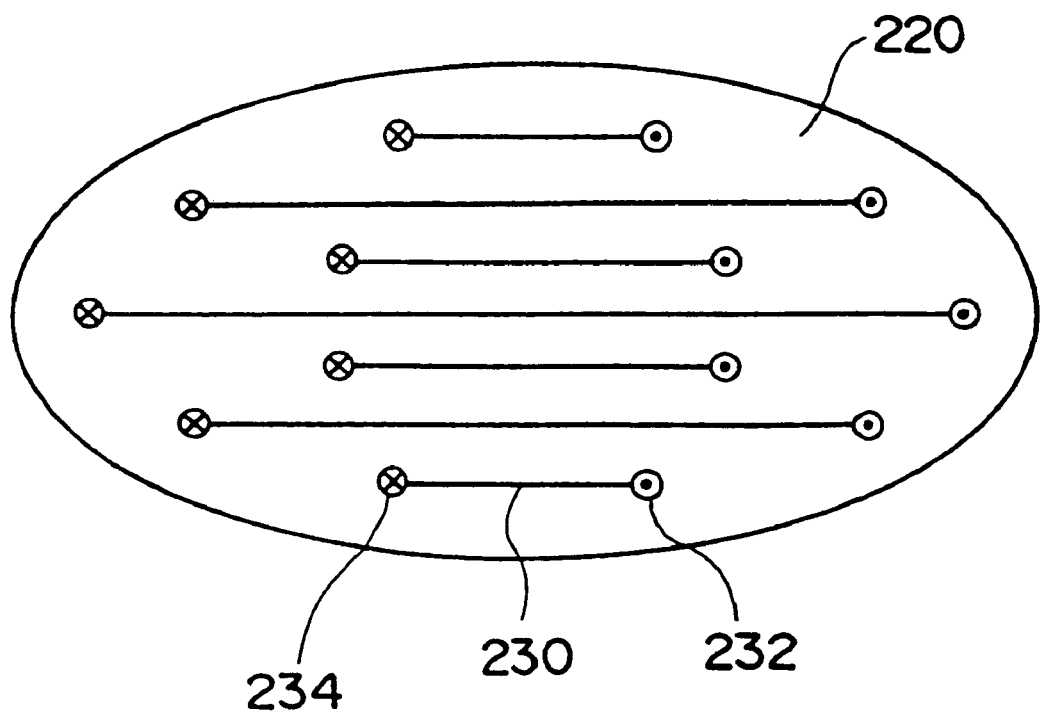
FIG. 15 is a diagram showing an example of the display of planar flows in the planar area of interest defined relative to the laminar flow in the cylinder.

Hence, on the basis of the result, the source points and the sink points are determined. As a result, source points 232 and sink points 234 are found as shown in FIG. 15 so that planar streamlines 230 joining them are obtained.

It is to be appreciated that the method of this embodiment could be implemented by allowing a computer to execute a program implementing the above-described procedure. In that case, the program is provided to the user in the form of a record medium such as a floppy disk or a CD-ROM for instance. By installing this into a fixed disk device attached to the computer for instance, it becomes possible to execute the program.

According to the planar flow display method of the present invention, as described above, it is possible to display as planar streamlines the state of the flow in a plane defined in the three-dimensional flow and to indicate through display of the source points and the sink points the tendency of the three-dimensional outflow from/inflow into that plane.

What is claimed is:

1. A method of displaying planar flows in a planar area defined in a three-dimensional flow, said method comprising the steps of:
   determining source points and sink points in said planar area on the basis of velocity information at each point in said planar area, wherein said source points and said sink points are representative of flow into and out of said planar area, respectively;
   finding a flow function in said planar area on the basis of velocity information at each point in said planar area; and
   displaying contour lines of said flow function in the form of planar streamlines in said planar area, and wherein said planar streamlines extend between respective source points and sink points which have the same values of said flow function.

2. A method according to claim 1, wherein
   said source points and said sink points are determined at predetermined flow rate intervals with respect to said flow function.

3. A method of displaying planar flows in a planar area defined in a three-dimensional flow, said method comprising the steps of:
   determining source points and sink points in said planar area on the basis of velocity information at each point in said pjanar area;
   finding a flow function in said planar area on the basis of velocity information at each point in said planar area; and
   displaying contour lines of said flow function in the form of planar streamlines, between said source points and sink points which have the same values of said flow function; and
   wherein said source points and said sink points are displayed distinguishably from each other in colors different from a color of said planar streamlines.

4. A method according to claim 1, wherein
   said planar streamlines are displayed with the direction of flows directed from said source points toward said sink points.

5. A method of displaying planar flows in a planar area defined in a three-dimensional flow, said method comprising the steps of:

determining source points and sink points in said planar area on the basis of velocity information at each point in said planar area;

finding a flow function in said planar area on the basis of velocity information at each point in said planar area; and displaying contour lines of said flow function in the form of planar streamlines, between said source points and sink points which have the same values of said flow function; and wherein said planar streamlines are displayed with the direction of flows directed from said source points toward said sink points; and wherein a dynamic image display is performed in which luminous points move from said source points toward said sink points along said planar streamlines.

6. A method according to claim 1, wherein said contour lines are displayed in such a manner as to be superposed on other types of images indicating the state of flows in said planar area.

7. A method of displaying planar flows in a planar area defined in a three-dimensional flow, said method comprising the steps of:

scanning said planar area by an observation beam to obtain a Doppler velocity profile in said planar area;

finding flow rates passing through paths orthogonal to said beam, on the basis of said Doppler velocity profile, to obtain from this result a flow rate distance function expressing a change in said flow rates along the direction of said beam;

approximating said flow range function by a stepwise function which varies with steps of a predetermined flow rate;

determining source points and sink points in said planar area on the basis of positions of said steps of said stepwise function, wherein said source points and said sink points are representative of flow into and out of said planar area; and providing a display of said determined source points and sink points.

8. A method according to claim 7, wherein in said step of determining said source points and sink points, said source points and sink points are defined as points having a maximum change in Doppler velocity in paths orthogonal to said beam direction at positions of said steps of said stepwise function.

9. A computer-readable medium having stored thereon instructions which cause a computer system to perform the steps of:

determining source points and sink points in said planar area on the basis of velocity information at each point in a planar area defined in a three-dimensional flow, wherein said source points and said sink points are representative of flow into and out of said planar area, respectively; and finding a flow function in said planar area, on the basis of said velocity information at each point in said planar area, to display contour lines of said flow function, such that said contour lines are located between respective source points and sink points which have the same values of said flow function.

* * * * *